United States Patent
Renz et al.

(10) Patent No.: US 12,500,290 B2
(45) Date of Patent: Dec. 16, 2025

(54) DEVICE FOR COOLING BATTERY CELLS OF A TRACTION BATTERY OF A MOTOR VEHICLE AND TRACTION BATTERY

(71) Applicants: Dr. Ing. h.c. F. Porsche Aktiengesellschaft, Stuttgart (DE); Rimac Automobiles Ltd., Sveta Nedelja (HR)

(72) Inventors: Fadi Renz, Kornwestheim (DE); Philip Ulrich, Ludwigsburg (DE); Dražen Dervišević, Zagreb (HR); Matko Skutari, Karlovac (HR); Inge Vinković, Samobor (HR)

(73) Assignees: Dr. Ing. h.c. F. Porsche Aktiengesellschaft (DE); Rimac Automobiles Ltd. (HR)

( * ) Notice: Subject to any disclaimer, the term of this patent is extended or adjusted under 35 U.S.C. 154(b) by 702 days.

(21) Appl. No.: 17/863,513

(22) Filed: Jul. 13, 2022

(65) Prior Publication Data
US 2023/0020708 A1    Jan. 19, 2023

(30) Foreign Application Priority Data
Jul. 14, 2021 (DE) ...................... 10 2021 118 249.2

(51) Int. Cl.
*H01M 10/6555* (2014.01)
*H01M 10/613* (2014.01)
(Continued)

(52) U.S. Cl.
CPC ..... *H01M 10/6557* (2015.04); *H01M 10/613* (2015.04); *H01M 10/625* (2015.04); *H01M 10/6568* (2015.04); *H01M 2220/20* (2013.01)

(58) Field of Classification Search
CPC .......... H01M 10/6557; H01M 10/613; H01M 10/625; H01M 10/6568; H01M 2220/20;
(Continued)

(56) References Cited

U.S. PATENT DOCUMENTS 8,830,676 B2    9/2014  Borck et al.
9,331,366 B2    5/2016  Fuerstner et al.
(Continued)

FOREIGN PATENT DOCUMENTS

DE    102006059989 A1    6/2008
DE    102009018787 A1    10/2010
(Continued)

*Primary Examiner* — Matthew T Martin
*Assistant Examiner* — Kevin Song
(74) *Attorney, Agent, or Firm* — Buchanan Ingersoll & Rooney PC

(57) ABSTRACT

A device for cooling battery cells of a traction battery which are arranged in at least two battery cell planes positioned one on top of the other. The device includes a first cooling plate which is arranged between a first battery cell plane and a second battery cell plane and is in thermal contact with the battery cells of the first and the second battery cell plane. Second cooling plates are arranged within the first and the second battery cell plane and are in thermal contact with multiple battery cells of the respective battery cell plane. A cooling fluid inlet is formed on a first side of the first cooling plate. A cooling fluid outlet is formed on a second side of the first cooling plate. The cooling fluid flows from the cooling fluid inlet into the first cooling plate on the first side of the first cooling plate.

18 Claims, 5 Drawing Sheets

(51) Int. Cl.
*H01M 10/625* (2014.01)
*H01M 10/6557* (2014.01)
*H01M 10/6568* (2014.01)

(58) Field of Classification Search
CPC ......... H01M 10/6552; H01M 10/6555; H01M 50/20; H01M 10/643; H01M 10/6554; H01M 10/6556; Y02E 60/10; B60L 50/64; B60L 58/26
See application file for complete search history.

(56) References Cited

U.S. PATENT DOCUMENTS

| | | | |
|---|---|---|---|
| 10,283,824 B2 | 5/2019 | Moschet et al. | |
| 10,910,685 B2 | 2/2021 | Schwarzer et al. | |
| 2012/0188714 A1* | 7/2012 | Von Borck | H01M 10/653 361/748 |
| 2018/0205125 A1* | 7/2018 | Burgers | F28F 9/0204 |

FOREIGN PATENT DOCUMENTS

| | | |
|---|---|---|
| DE | 102012111970 A1 | 6/2014 |
| DE | 102016208053 A1 | 11/2017 |
| DE | 102020117034 A1 | 12/2021 |
| WO | WO-2020046431 A2 * 3/2020 | ................ F28F 3/12 |

* cited by examiner

DEVICE FOR COOLING BATTERY CELLS OF A TRACTION BATTERY OF A MOTOR VEHICLE AND TRACTION BATTERY

CROSS-REFERENCE TO RELATED APPLICATION

This application claims priority to German Patent Application No. 10 2021 118 249.2, filed Jul. 14, 2021, the content of such application being incorporated by reference herein in its entirety.

FIELD OF THE INVENTION

The invention relates to a device for cooling battery cells of a traction battery of a motor vehicle which are arranged in at least two battery cell planes positioned one above the other. The invention also relates to a traction battery.

BACKGROUND OF THE INVENTION

Traction batteries used to store electrical energy in order to provide same to an electric machine are installed in motor vehicles, such as in hybrid vehicles or else electric vehicles, for example. In this respect, traction batteries have multiple battery cells, which are electrically connected to one another. During operation, the battery cells undergo heating, for example as a result of chemical reactions within the battery cells. In order to avoid damage to the traction battery as a result of overheating of the battery cells, it is necessary to dissipate heat from the traction battery by cooling the battery cells. Cooling battery cells of a traction battery is already known.

DE 10 2006 059 989 A1, which is incorporated by referenced herein, discloses a battery having multiple battery cells, the battery cells being in thermal contact with a base plate and the battery cells making thermal contact with the base plate by way of cooling elements, which are arranged in the interstices of the densest packing of the battery cells. The outer contour of the cooling elements has a trigonal symmetry and makes contact with the cylindrical outer sides of the battery cells. A cooling medium flows through the cooling plate.

DE 10 2012 111 970 A1, which is incorporated by referenced herein, discloses a further battery having multiple battery cells, each of which has two terminals. A respective terminal of each of the battery cells is arranged in a form-fitting manner and/or force-fitting manner on a terminal plate, as a result of which the battery cells are connected to one another. A perforated plate, through the holes in which a cooling medium can be injected, is arranged above the terminal plate.

SUMMARY OF THE INVENTION

There is a need for a device for cooling the battery cells of a traction battery of a motor vehicle that ensures effective cooling of the battery cells and has a compact structure.

Described herein is a device for cooling battery cells of a traction battery of a motor vehicle which are arranged in at least two battery cell planes positioned one above the other, and a traction battery having such a device for cooling the battery cells.

The device according to aspects of the invention has a first cooling plate, which is arranged between a first battery cell plane and a second battery cell plane and is in thermal contact with the battery cells of the first battery cell plane and in thermal contact with the battery cells of the second battery cell plane.

The device according to aspects of the invention also has at least one second cooling plate, which is arranged within the first battery cell plane, and at least one further second cooling plate, which is arranged within the second battery cell plane and is in thermal contact with multiple battery cells of the respective battery cell plane.

The device according to aspects of the invention also has a cooling fluid inlet, which is formed on a first side of the first cooling plate, and a cooling fluid outlet, which is formed on a second side of the first cooling plate.

The first cooling plate and the cooling fluid inlet are formed in such a way that the cooling fluid flows from the cooling fluid inlet into the first cooling plate on the first side of the first cooling plate.

The first cooling plate and the second cooling plate are formed in such a way that a first portion of the cooling fluid flowing into the first cooling plate on the first side flows through the first cooling plate toward the second side of the first cooling plate. They are also formed in such a way that a second portion of the cooling fluid flowing into the first cooling plate on the first side flows from the first cooling plate into the second cooling plates on the first side of the first cooling plate, flows through the second cooling plates and flows from the second cooling plates into the first cooling plate on the second side of the first cooling plate.

The first cooling plate and the cooling fluid outlet are formed in such a way that the cooling fluid flows from the first cooling plate into the cooling fluid outlet on the second side of the first cooling plate.

Such a device has an especially compact design and allows effective cooling of battery cells of a traction battery of a motor vehicle which are arranged in at least two battery cell planes positioned one above the other.

It is preferably the case that a first flow channel of the first cooling plate is formed on the first side of the first cooling plate and a second flow channel of the first cooling plate is formed on the second side, opposite to the first side of the first cooling plate, of the first cooling plate, wherein multiple third flow channels of the first cooling plate extend between the first flow channel of the first cooling plate and the second flow channel of the first cooling plate. The first flow channel of the first cooling plate is coupled to the cooling fluid inlet, the second cooling plates and the third flow channels of the first cooling plate. The second flow channel of the first cooling plate is coupled to the cooling fluid outlet, the second cooling plates and the third flow channels of the first cooling plate. These features also serve to effectively cool the battery cells of the traction battery which are arranged in at least two battery cell planes arranged one above the other with a compact structure.

The respective second cooling plate preferably has a first flow channel, which is subdivided into a first sub-channel and a second sub-channel, on the first side of the first cooling plate, and a second flow channel, which is likewise subdivided into a first sub-channel and a second sub-channel, on the second side of the first cooling plate, wherein at least one third flow channel of the respective second cooling plate extends between the first flow channel of the respective second cooling plate and the second flow channel of the respective second cooling plate. The first sub-channel of the first flow channel of the respective second cooling plate is coupled to the first flow channel of the first cooling plate. The second sub-channel of the second flow channel of the respective second cooling plate is coupled to the second flow channel of the first cooling plate. This makes it possible to further increase the effectiveness of the cooling of the battery cells of a traction battery which are arranged in two battery cell planes arranged one above the other in combination with a compact structure.

The first flow channel of the respective second cooling plate preferably has an outer tube, which is subdivided into two separate sub-chambers, wherein a first sub-chamber of the first flow channel of the respective second cooling plate is coupled to one of the multiple third flow channels of the respective second cooling plate and to the first flow channel of the first cooling plate, and wherein a second sub-chamber of the first flow channel of the second cooling plate is coupled to the other ones of the multiple third flow channels of the respective second cooling plate. In particular, the first flow channel of the respective second cooling plate is formed by the outer tube and an inner tube, wherein, as viewed from the first cooling plate, the inner tube extends at least partially within the outer tube and leads into the first sub-chamber of the outer tube, which first sub-chamber is separated from the second sub-chamber, positioned between the inner tube and the outer tube, of the outer tube, wherein a cavity of the inner tube and the first sub-chamber of the outer tube form the first sub-channel of the first flow channel of the respective second cooling plate, wherein the second sub-chamber of the outer tube forms the second sub-channel of the first flow channel of the respective second cooling plate. The first sub-chamber of the first flow channel of the respective second cooling plate is coupled to the first flow channel of the first cooling plate and to one of multiple third flow channels of the respective second cooling plate. The second sub-chamber of the first flow channel of the respective second cooling plate is coupled to the other ones of the third flow channels of the respective second cooling plate. These features are particularly preferred in order to allow flow guidance of the cooling fluid in the region of the first flow channel of the respective second cooling plate, and thus ensure effective cooling in combination with a compact structure.

The second flow channel of the respective second cooling plate is preferably formed by an outer tube, which is subdivided into two separate sub-chambers, wherein a second sub-chamber of the outer tube forming the second flow channel of the second cooling plate forms the second sub-channel of the second flow channel and is coupled to one of the multiple third flow channels of the respective second cooling plate and to the second flow channel of the first cooling plate, and wherein a first sub-chamber of the outer tube forming the second flow channel of the second cooling plate forms the first sub-channel of the second flow channel and is coupled to the other ones of the multiple third flow channels of the respective second cooling plate. These features are advantageous in order to provide an advantageous flow of cooling fluid in the region of the second flow channel of the respective second cooling plate and therefore effective cooling of the battery cells in combination with a compact structure.

BRIEF DESCRIPTION OF THE DRAWINGS

Preferred developments of the invention will emerge from the claims and the description below. Exemplary embodiments of the invention will be explained in more detail on the basis of the drawing, without being restricted thereto. In the drawing:

DETAILED DESCRIPTION OF THE INVENTION

Figure 1:
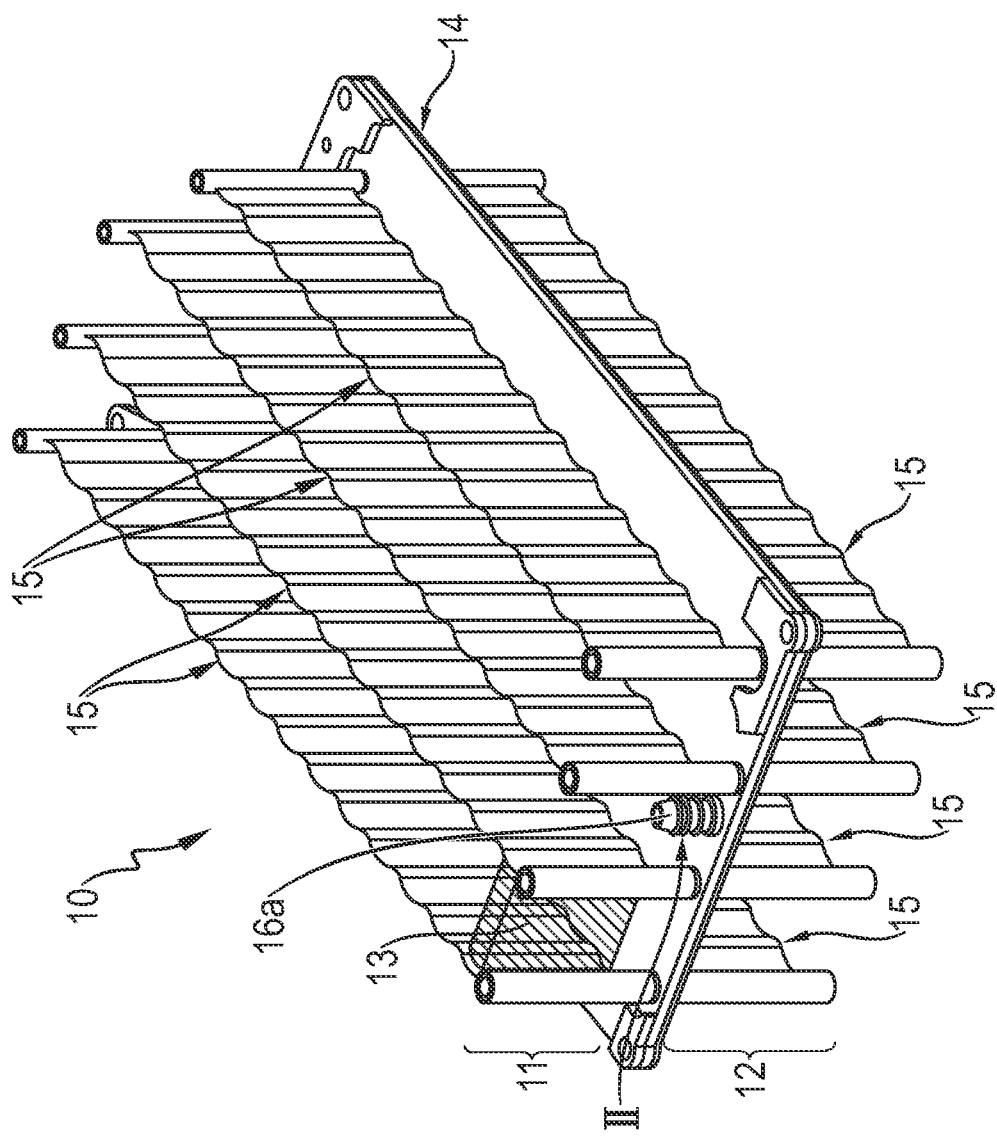
FIG. 1 shows a perspective view of a device for cooling battery cells of a traction battery of a motor vehicle which are arranged in at least two battery cell planes positioned one above the other.

FIG. 1 shows a preferred exemplary embodiment of a device according to aspects of the invention for cooling battery cells of a traction battery of a motor vehicle which are arranged in at least two battery cell planes positioned one above the other.

In the exemplary embodiment of FIG. 1, the device 10 shown there is used for cooling battery cells 13 arranged in two battery cell planes 11, 12 arranged one above the other, with FIG. 1 showing only one such battery cell 13 in the upper battery cell plane 11.

The device 10 has a first cooling plate 14, which is arranged between the first battery cell plane 11 and the second battery cell plane 12 and is in thermal contact with the battery cells 13 of the first battery cell plane 11 and in thermal contact with the battery cells 13 of the second battery cell plane 12. Therefore, this first cooling plate 14 is in thermal contact with a bottom side of the battery cells 13 of the first battery cell plane 11 and with a top side of the battery cells 13 of the second battery cell plane 12.

Electrical contacts of the battery cells 13 are formed on the top side of the battery cells 13 in the first battery cell plane 11, and on the bottom side of the battery cells 13 in the second battery cell plane 12. Those sides of the respective battery cells 13 on which the electrical contacts of the battery cells 13 are formed therefore face away from the first cooling plate 14. Accordingly, the battery cells 13 lie against the first cooling plate 14 by way of their sides that face away from the electrical contacts of the battery cells 13.

Figure 6:
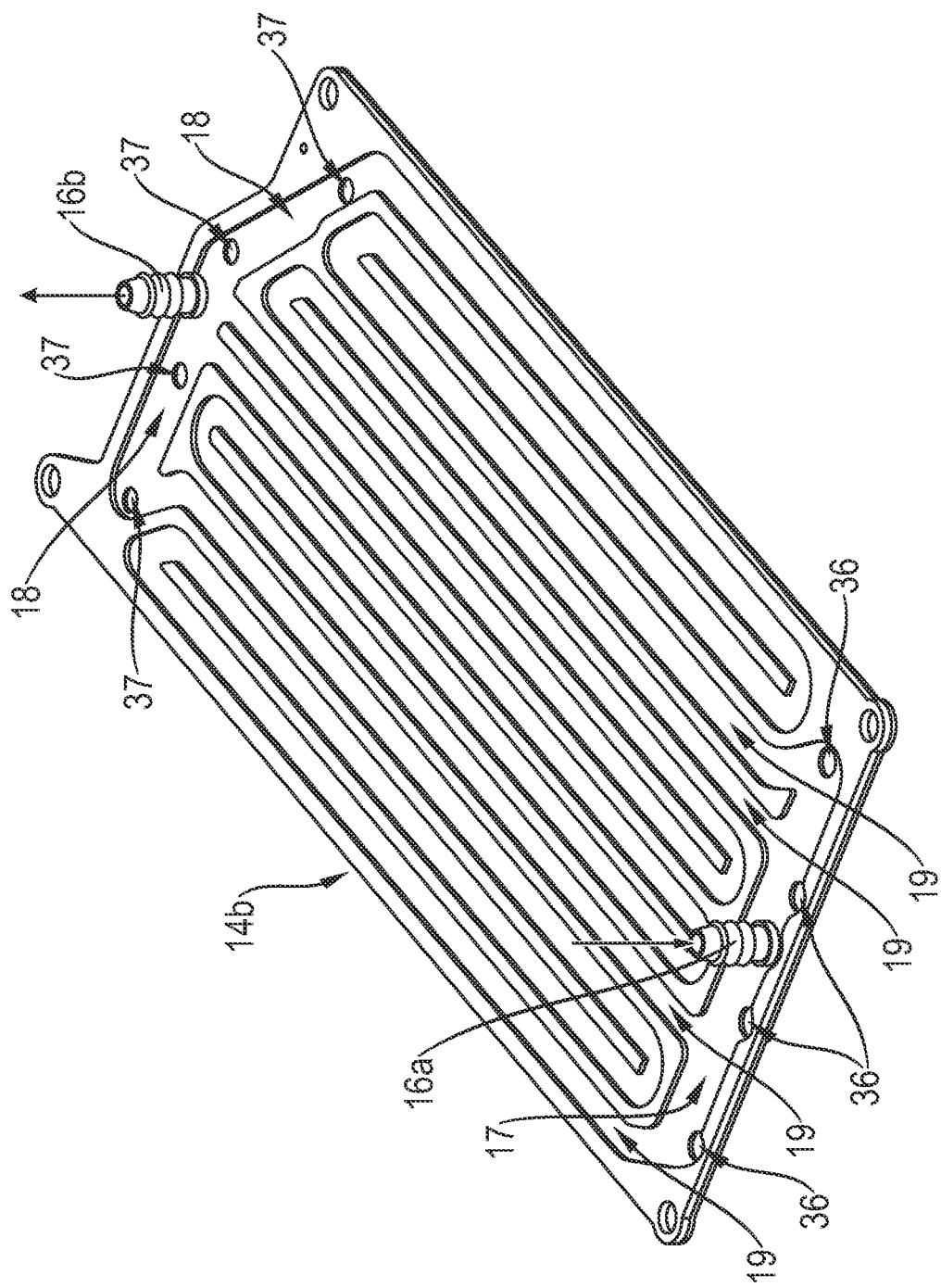
FIG. 6 shows a perspective view of a detail of the device according to FIG. 1.

A cooling fluid flows through the first cooling plate 14, which has a sandwich-like structure composed of three sub-plates 14a, 14b and 14c. The two sub-plates 14a, 14c form the outer sides of the first cooling plate 14, by way of which the first cooling plate 14 is in thermal contact with the battery cells 13 of the two battery cell planes 11, 12. The sub-plate 14b is arranged in a sandwich-like manner between the sub-plates 14a, 14c and together with the sub-plates 14a, 14c defines flow channels of the first cooling plate 14 for the cooling medium, with FIG. 6 showing a perspective view of this central sub-plate 14b of the first cooling plate 14.

The device 10 also has at least one second cooling plate 15, in the exemplary embodiment shown in particular four second cooling plates, within the first battery cell plane 11. Similarly, the device 10 has at least one further second cooling plate 15, in the exemplary embodiment shown in particular four further second cooling plates, in the second battery cell plane 12. Similarly to the first cooling plate 14, the cooling fluid also flows through the second cooling plates 15, each of the second cooling plates 15 being in thermal contact with multiple battery cells 13 of the respective battery cell plane 11 and 12, specifically with side walls of the battery cells 13.

The device 10 furthermore has a cooling fluid inlet 16a or cooling fluid inflow, which is formed on a first side of the first cooling plate 14, and also a cooling fluid outlet 16b or cooling fluid outflow, which is formed on an oppositely situated second side of the first cooling plate 14.

Figure 3:
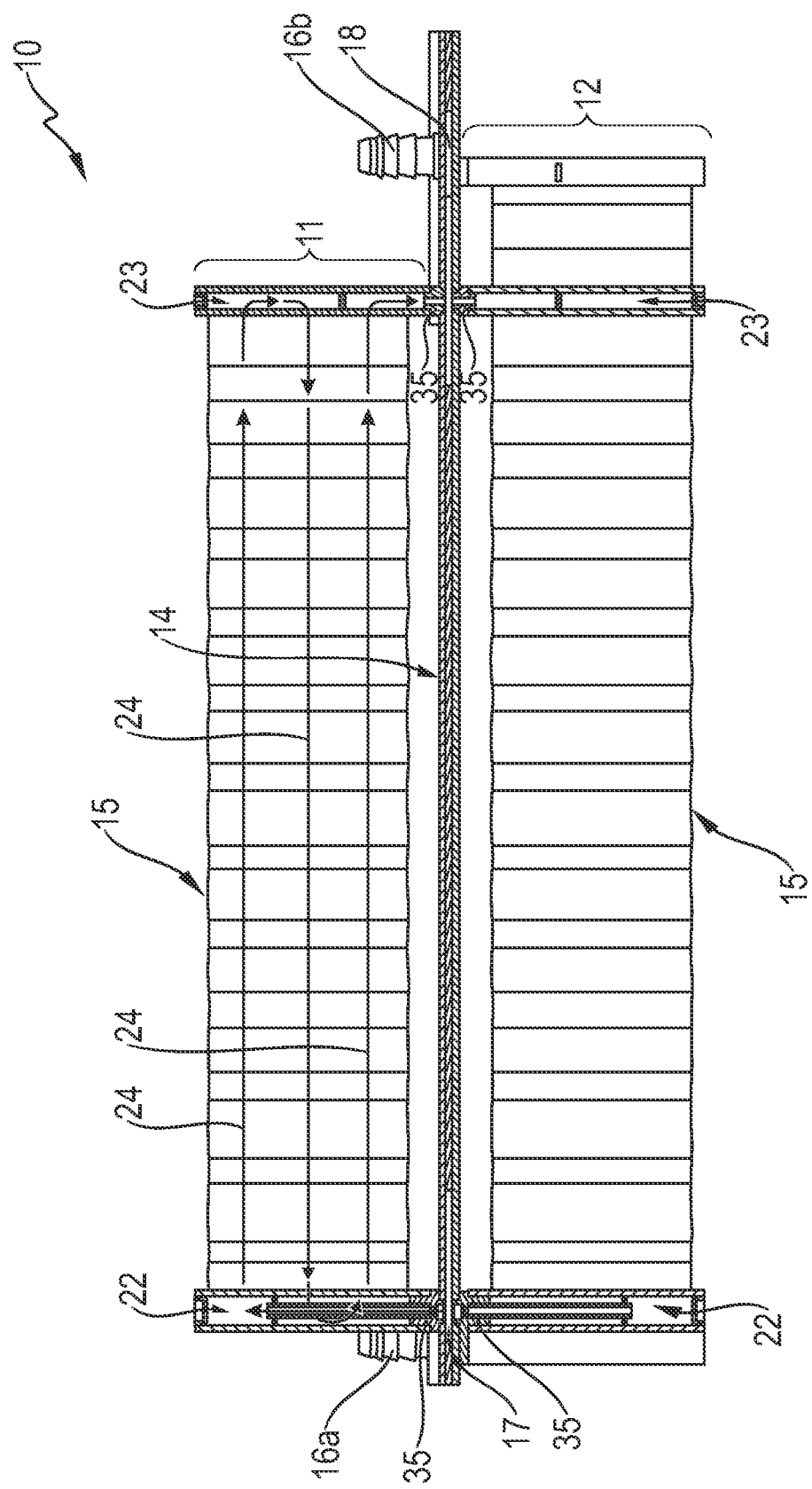
FIG. 3 shows a side view of the device according to FIG. 1.

Only the cooling fluid inlet 16a can be seen in FIG. 1. Both the cooling fluid inlet 16a and the cooling fluid outlet 16b are shown in FIG. 3.

The cooling fluid flows from the cooling fluid inlet 16a into the first cooling plate 14 on the first side of the first cooling plate 14.

A first portion of this cooling fluid flowing into the first cooling plate 14 on the first side flows through the first cooling plate 14 toward the oppositely situated second side of the first cooling plate 14.

A second portion of the cooling fluid flowing into the first cooling plate 14 on the first side flows from the first cooling plate 14 into the second cooling plates 15 on the first side of the first cooling plate 14, flows through the second cooling plates 15 and flows from the second cooling plates 15 back into the first cooling plate 14 on the second side of the first cooling plate 14. The cooling fluid then flows from the first cooling plate 14 into the cooling fluid outlet 16b on the second side of the first cooling plate 14.

The device according to aspects of the invention allows especially effective cooling of the battery cells 13 of a traction battery of a motor vehicle with a compact structure.

As already set out above, the sub-plates 14a, 14b, 14c of the first cooling plate 14 together form flow channels for cooling fluid. For this purpose, the central sub-plate 14b, which is covered at the top and bottom by the sub-plates 14a, 14c, is contoured preferably as shown in FIG. 6, in order, together with the sub-plates 14a, 14c, to form flow channels of the first cooling plate 14.

As can be seen in FIG. 6, a first flow channel 17 may be formed on the first side of the first cooling plate 14. The cooling fluid inlet 16a is also formed on this first side.

A second flow channel 18 of the first cooling plate 14 is formed on the oppositely situated second side of the cooling plate 14, on which the cooling fluid outlet 16b is formed.

Multiple third flow channels 19 of the first cooling plate 14 extend between the first flow channel 17 of the first cooling plate 14 and the second flow channel 18 of the first cooling plate 14.

Each of these third flow channels 19 of the first cooling plate 14 preferably has a meandering form.

Each of the third flow channels 19 of the first cooling plate 14 has a meandering form such that the respective third flow channel 19 extends firstly from the first side of the first cooling plate 14, and thus from the first flow channel 17 thereof, toward the second side of the first cooling plate 14, then back from the second side of the cooling plate 14 toward the first side of the first cooling plate 14 and subsequently in turn back from the first side of the cooling plate 14 toward the second side of the cooling plate 14 toward the second flow channel 18 of the first cooling plate 14, with the result that the cooling fluid flowing through the third flow channels 19 of the first cooling plate 14 flows back and forth multiple times between the first side and the second side of the first cooling plate 14 before the cooling fluid arrives in the region of the second flow channel 18 of the first cooling plate 14. The first flow channel 17 and the second flow channel 18 of the first cooling plate 14 each have a larger flow cross-sectional area than the third flow channels 19 of the first cooling plate 14. This is of advantage for the cooling fluid to advantageously flow through the first cooling plate 14 and accordingly for particularly efficient cooling of the battery cells 13 by way of the first cooling plate 14. In particular, a homogeneous flow distribution within the first cooling plate 14 is ensured.

The first flow channel 17 of the first cooling plate 14 is fluidically coupled to the cooling fluid inlet 16a, the second cooling plates 15 and the third flow channels 19 of the first cooling plate 14. Fluidically means on the coolant flow side. The coolant is a cooling fluid, in particular a cooling liquid such as water, for example.

Figure 2:
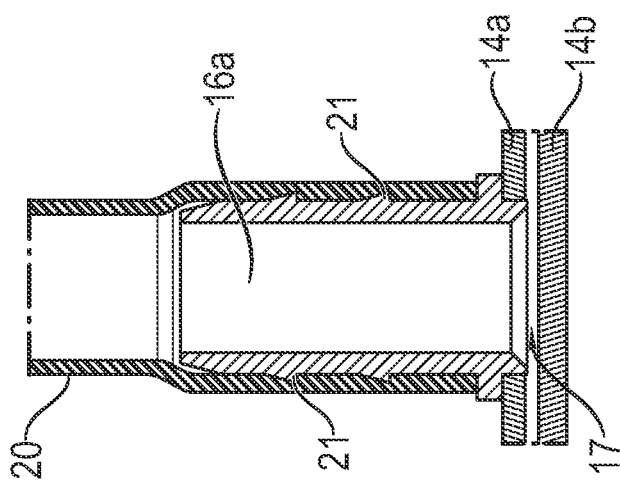
FIG. 2 shows a cross section through the device in the region of the detail II of FIG. 1 together with a hose.

The fluidic coupling of the cooling fluid inlet 16a to the first flow channel 17 of the first cooling plate 14 is shown in greater detail in FIG. 2. Cooling fluid which is supplied via the cooling fluid inlet 16a of the device 10 according to aspects of the invention flows from the cooling fluid inlet 16a into the first flow channel 17 of the first cooling plate 14.

FIG. 2 shows a hose 20, which is plugged on the cooling fluid inlet 16a by way of one end and is preferably connected to the cooling fluid inlet 16a via a press-in connection or interference fit. This allows the hose 20 to be reliably connected to the cooling fluid inlet 16a if the installation space is constricted. As an alternative, the hose 20 and the cooling fluid inlet 16a may also be connected via a clamp, which is not shown, in order to supply cooling fluid to the cooling fluid inlet 16a.

A hose 20 of this type is preferably also connected to the cooling fluid outlet 16b.

As can be seen in the figures, both the cooling fluid inlet 16a and the cooling fluid outlet 16b have barb-like projections 21 on their outer contour, in order to retain the respective hose 20 reliably and in a fluid-tight manner on the cooling fluid inlet 16a or cooling fluid outlet 16b.

As already set out above, the first flow channel 17 of the first cooling plate 14 is fluidically coupled not just to the cooling fluid inlet 16a but also to the third flow channels 19 of the first cooling plate 14, as well as to the second cooling plates 15 via openings 36 shown in FIG. 6.

On the opposite side of the first cooling plate 14, the second flow channel 18 of the first cooling plate 14 is fluidically coupled to the cooling fluid outlet 16b, further to the third flow channels 19 of the first cooling plate 14, and in turn to the second cooling plates 15 via openings 37.

Each of the second cooling plates 15 has a first flow channel 22, which is subdivided into a first sub-channel 22a and a second sub-channel 22b, on the first side of the first cooling plate 14 and therefore on a first side thereof. Each second cooling plate 15 also has a second flow channel 23, which is likewise subdivided into a first sub-channel 23a and a second sub-channel 23b, on the oppositely situated second side of the first cooling plate 14 and therefore on an oppositely situated second side thereof.

At least one third flow channel 24, preferably multiple third flow channels 24, specifically in the exemplary embodiment shown three flow channels 24, extend(s) between the first flow channel 22 of the respective second cooling plate 15 and the second flow channel 23 of the respective second cooling plate 15, wherein flow passes through two respective adjacent third flow channels 24 in opposite directions.

The first sub-channel 22a of the first flow channel 22 of each second cooling plate 15 is fluidically coupled to the first flow channel 17 of the first cooling plate 14. The second sub-channel 23b of the second flow channel 23 of each second cooling plate 15 is fluidically coupled to the second flow channel 18 of the first cooling plate 14.

The first flow channel 22 of the respective second cooling plate 15 comprises an outer tube 25, which is subdivided into two separate sub-chambers 27, 28. A first sub-chamber 27 of the first flow channel 22 of the respective second cooling plate 15 is coupled to one of the multiple third flow channels 24 of the respective second cooling plate 15 and to the first flow channel 17 of the first cooling plate 14.

A second sub-chamber 28 of the first flow channel 22 of the second cooling plate 15 is coupled to the other ones of the multiple third flow channels 24 of the respective second cooling plate 15.

Figure 4:
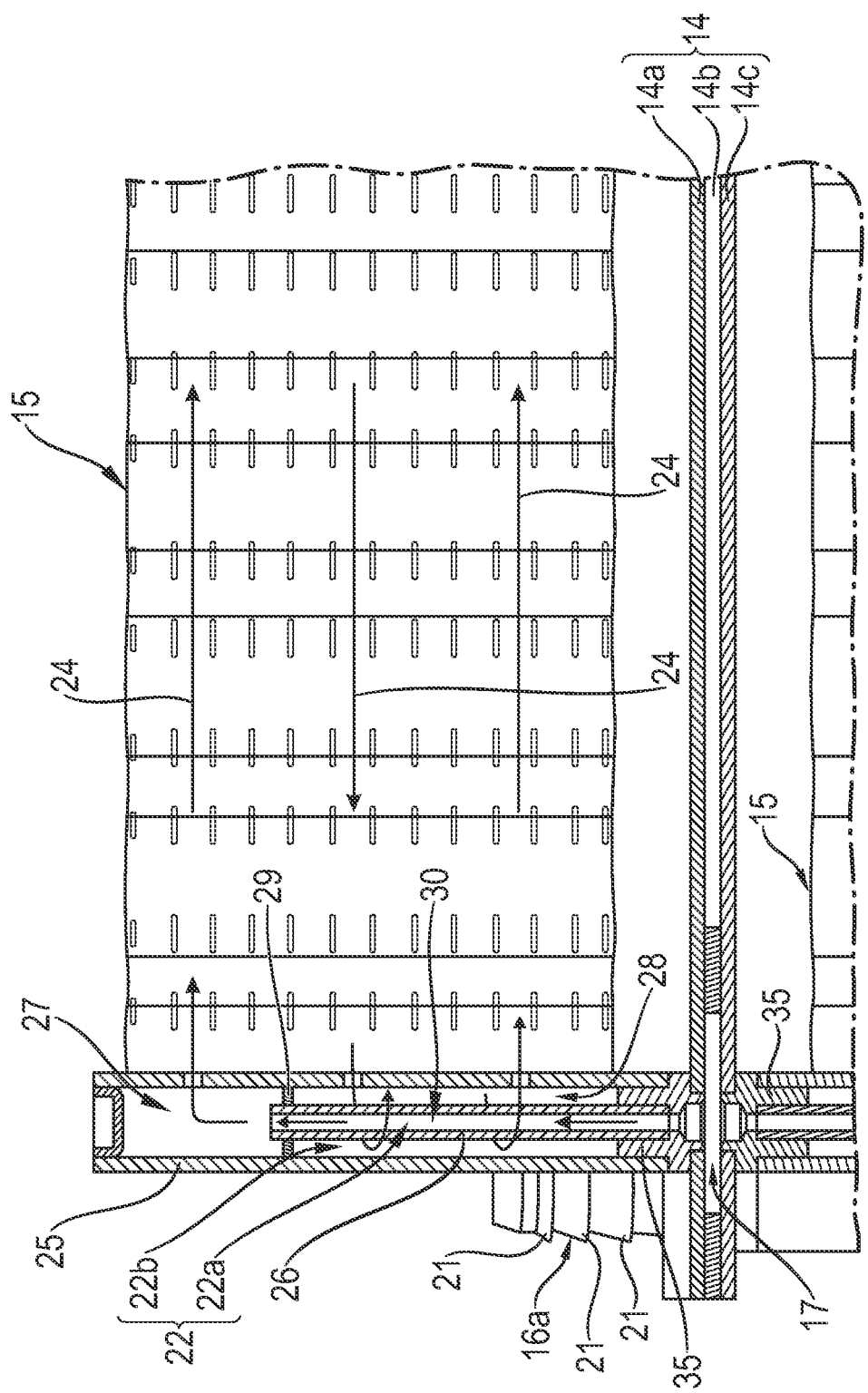
FIG. 4 shows a first detail of FIG. 3.

As can be seen best in FIG. 4, the first flow channel 22 of the respective second cooling plate 15 is formed by the outer tube 25 and an inner tube 26 in the exemplary embodiment shown. The inner tube 26 extends within the outer tube 25 starting from the first cooling plate 14 partially within the outer tube 25 and leads into the first sub-chamber 27 of the outer tube 25. This first sub-chamber 27 of the outer tube 25 is separated from the second sub-chamber 28, positioned between the inner tube 26 and the outer tube 25, of the outer tube 25, specifically preferably via a separating plate 29.

A cavity 30 delimited by the inner tube 26 forms, together with the first sub-chamber 27 of the outer tube 25, the first sub-channel 22a of the first flow channel 22 of the respective second cooling plate 15. The second sub-chamber 28 of the outer tube 25 forms the second sub-channel 22b of the first flow channel 22 of the respective second cooling plate 15.

The inner tube 26 or the cavity 30 thereof defined by the inner tube 26 is fluidically coupled to the first flow channel 17 of the first cooling plate 14. The first sub-chamber 27 of the outer tube 25 of the respective second cooling plate 15 is fluidically coupled to the cavity 30 of the inner tube 26, and further to one of the third flow channels 24 of the respective second cooling plate 15.

That third flow channel 24 of the respective second cooling plate 15 that is fluidically coupled to the first sub-chamber 27 of the outer tube 25 is that third flow channel 24 of the respective second cooling plate 15 that is furthest away from the first cooling plate 14.

The second sub-chamber 28, which is formed between the inner tube 26 and the outer tube 25 and forms the second sub-channel 22b of the first flow channel 22 of the respective second cooling plate 15, of the outer tube 25 is fluidically coupled to the other third flow channels 24 of the respective second cooling plate 15.

At the oppositely situated second end of the first cooling plate 14 and of the respective second cooling plate 15, the second flow channel 23 of the respective second cooling plate 15 is defined by an outer tube 31 and in particular subdivided into two separate sub-chambers 33, 34 via a separating plate 32, the sub-chamber 33 defining the first sub-channel 23a and the sub-chamber 34 defining the second sub-channel 23b of the second flow channel 23 of the respective second cooling plate 15.

Figure 5:
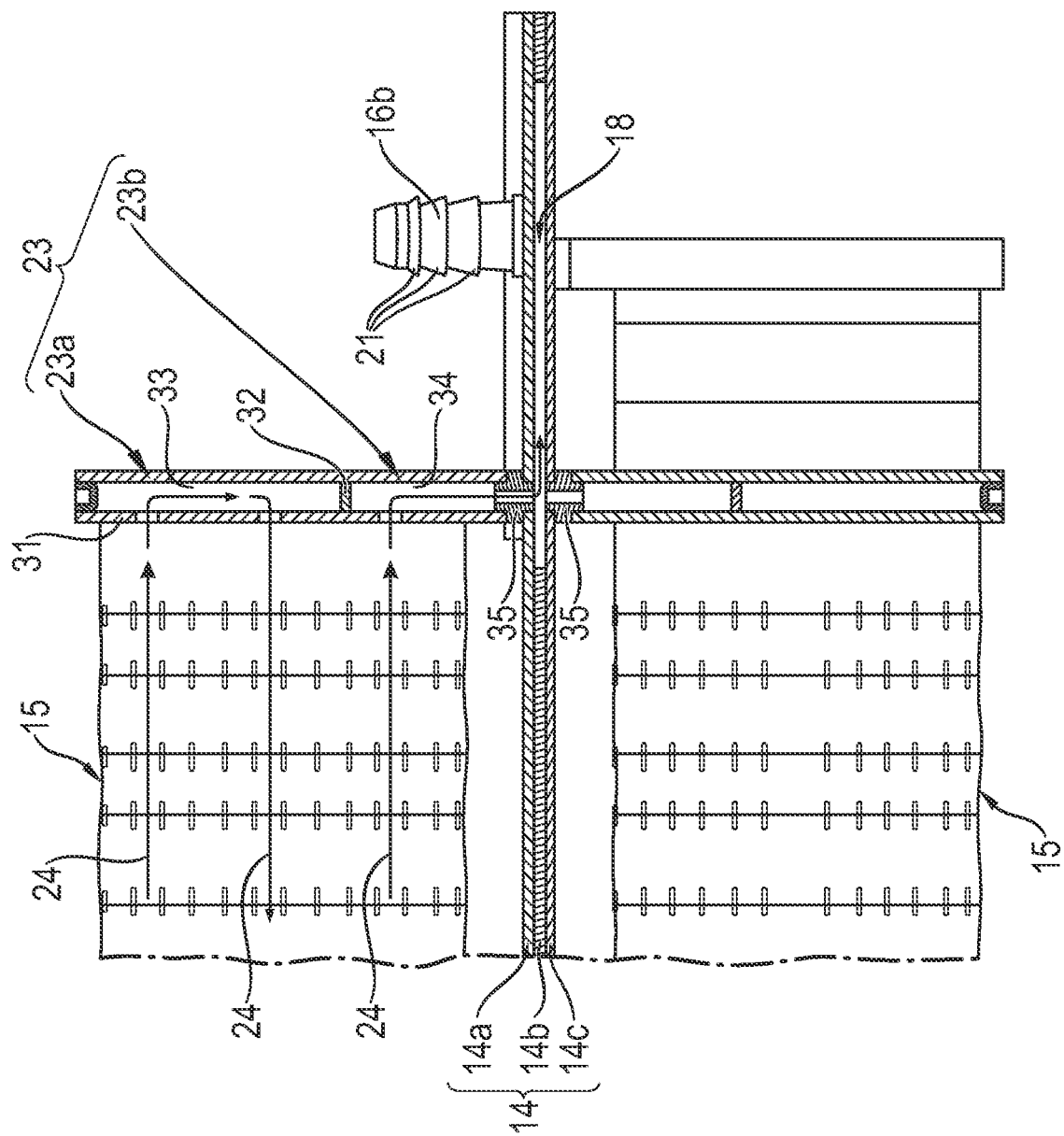
FIG. 5 shows a second detail of FIG. 3.

In this respect, according to FIG. 5, the first sub-chamber 33 and therefore the first sub-channel 23a of the second flow channel 23 of the respective second cooling plate 15 is fluidically coupled to some of the third flow channels 24, and the second sub-chamber 34 and therefore the second sub-channel 23b of the second flow channel 23 of the respective second cooling plate 15 is fluidically coupled both to one of the third flow channels 24 of the respective second cooling plate 14 and to the second flow channel 18 of the first cooling plate 14.

That third flow channel 24 of the respective second cooling plate 15 that is fluidically coupled to the second sub-chamber 34 of the outer tube 31 is that third flow channel 24 of the respective second cooling plate 15 that is closest to the first cooling plate 14.

Cooling fluid, which accordingly flows into the first flow channel 17 of the first cooling plate 14 via the cooling fluid inlet 16a, is divided into two partial flows. A first one of these partial flows flows exclusively through the first cooling plate 14 starting from the first flow channel 17 toward the second flow channel 18 of the first cooling plate 14 through the third flow channels 19 of the first cooling plate 14.

A second portion of this flow flows from the first flow channel 17 of the first cooling plate 14 into the first sub-channels 22a of the first flow channels 22 of the second cooling plates 15, enters the respective sub-chamber 27 and from there enters one of the third flow channels 24 of the respective second cooling plate 15.

By way of this third flow channel 24 of the respective second cooling plate 15, the cooling fluid flows starting from the first side of the first cooling plate 14 toward the second side of the first cooling plate 14, there into the first sub-channel 23a of the second flow channel 23 of the respective second cooling plate 15, back from there in a further third flow channel 24 of the respective second cooling plate 15 back toward the first flow channel 22 of the respective second cooling plate 15, in order there to enter the second sub-channel 22b of the first flow channel 22, from there to enter a further third flow channel 24 of the respective second cooling plate 15 and then to flow through same toward the second sub-channel 23b of the second flow channel 23 of the respective second cooling plate 15, subsequently to enter the second sub-channel 23b of the second flow channel 23 of the respective second cooling plate 15 and from there to flow into the second flow channel 18 of the first cooling plate 14, in order from there to flow away via the cooling fluid outlet 16b.

As can be seen best in FIGS. 3, 4 and 5, the flow channels of the cooling plates, specifically the first flow channel 17 of the first cooling plate 14, are fluidically coupled to the first flow channels 22 of the second cooling plates 15, and the second flow channels 23 of the second cooling plate 15 are fluidically coupled to the second flow channel 18 of the first cooling plate 14, specifically, as was described in connection with FIG. 6, via the openings 36, 37, with connector pieces 35 extending into these openings 36, 37 in order to allow a controlled transfer of the cooling fluid from the first flow channel 17 of the first cooling plate 14 to the first flow channels 22 of the second cooling plates 15 and from the second flow channels 23 of the second cooling plates 15 to the second flow channel 18 of the first cooling plate 14.

The device according to aspects of the invention allows efficient cooling of the battery cells 13 of a traction battery, which are arranged in battery cell planes 11, 12 arranged one on top of the other, with a compact structure.

What is claimed is:

1. A device for cooling battery cells of a traction battery of a motor vehicle which are arranged in at least two battery cell planes that are positioned one above the other, said device comprising:
   a first cooling plate arranged (i) between a first battery cell plane and a second battery cell plane, (ii) in thermal contact with the battery cells of the first battery cell plane, and (iii) in thermal contact with the battery cells of the second battery cell plane,
   at least one second cooling plate arranged within the first battery cell plane, at least one further second cooling plate arranged within the second battery cell plane and in thermal contact with multiple battery cells of the second battery cell plane, a cooling fluid inlet disposed on a first side of the first cooling plate, a cooling fluid outlet disposed on a second side of the first cooling plate, wherein the first cooling plate, the second cooling plates, the cooling fluid inlet and the cooling fluid outlet are arranged in such a way that:

(i) cooling fluid flows from the cooling fluid inlet into the first cooling plate on the first side of the first cooling plate, (ii) a first portion of the cooling fluid flowing into the first cooling plate on the first side flows through the first cooling plate toward the second side of the first cooling plate, (iii) a second portion of the cooling fluid flowing into the first cooling plate on the first side flows: (a) from the first cooling plate into the second cooling plates on the first side of the first cooling plate, (b) through the second cooling plates, and (c) from the second cooling plates into the first cooling plate on the second side of the first cooling plate, and (iv) the cooling fluid flows from the first cooling plate into the cooling fluid outlet on the second side of the first cooling plate, (v) wherein the first portion of the cooling fluid flows along a first fluid path and the second portion of the cooling fluid flows along a second fluid path that bypasses the first fluid path.

2. The device as claimed in claim 1, wherein a first flow channel of the first cooling plate is disposed on the first side of the first cooling plate, a second flow channel of the first cooling plate is disposed on the second side of the first cooling plate, multiple third flow channels of the first cooling plate extend between the first flow channel of the first cooling plate and the second flow channel of the first cooling plate.

3. The device as claimed in claim 2, wherein the first flow channel of the first cooling plate is coupled to the cooling fluid inlet, the second cooling plates and the third flow channels of the first cooling plate, and the second flow channel of the first cooling plate is coupled to the cooling fluid outlet, the second cooling plates and the third flow channels of the first cooling plate.

4. The device as claimed in claim 2, wherein the first flow channel of the first cooling plate and the second flow channel of the first cooling plate each have a larger flow cross-sectional area than the third flow channels of the first cooling plate.

5. The device as claimed in claim 1, wherein each second cooling plate comprises:

a first flow channel, which is subdivided into a first sub-channel and a second sub-channel, on the first side of the first cooling plate, a second flow channel, which is subdivided into a first sub-channel and a second sub-channel, on the second side of the first cooling plate, at least one third flow channel that extends between the first flow channel of the second cooling plate and the second flow channel of the second cooling plate.

6. The device as claimed in claim 5, wherein the first sub-channel of the first flow channel is coupled to the first flow channel of the first cooling plate, and the second sub-channel of the second flow channel is coupled to the second flow channel of the first cooling plate.

7. The device as claimed in claim 5, wherein:

the first flow channel of each second cooling plate comprises an outer tube, which is subdivided into two separate sub-chambers, a first sub-chamber of the first flow channel of each second cooling plate is coupled to one of multiple third flow channels of the second cooling plate and to the first flow channel of the first cooling plate, a second sub-chamber of the first flow channel of each second cooling plate is coupled to the other ones of the multiple third flow channels of the second cooling plate.

8. The device as claimed in claim 7, wherein:

the first flow channel of each second cooling plate is constituted by the outer tube and an inner tube, as viewed from the first cooling plate, the inner tube extends at least partially within the outer tube and leads into the first sub-chamber of the outer tube, which first sub-chamber is separated from the second sub-chamber, a cavity of the inner tube and the first sub-chamber of the outer tube form the first sub-channel of the first flow channel of the second cooling plate, and the second sub-chamber of the outer tube forms the second sub-channel of the first flow channel of the second cooling plate.

9. The device as claimed in claim 7, wherein:

the first sub-chamber of the first flow channel of the respective second cooling plate is coupled to the first flow channel of the first cooling plate and to at least one of multiple third flow channels of the second cooling plate, and the second sub-chamber of the first flow channel of the second cooling plate is coupled to the other ones of the multiple third flow channels of the respective second cooling plate.

10. The device as claimed in claim 5, wherein:

the second flow channel of the respective second cooling plate is formed by an outer tube, which is subdivided into two separate sub-chambers, a second sub-chamber of the outer tube forming the second flow channel of the second cooling plate forms the second sub-channel of the second flow channel and is coupled to one of the multiple third flow channels of the respective second cooling plate and to the second flow channel of the first cooling plate, and a first sub-chamber of the outer tube forming the second flow channel of the second cooling plate forms the first sub-channel of the second flow channel and is coupled to the other ones of the multiple third flow channels of the respective second cooling plate.

11. A traction battery of a motor vehicle comprising:

multiple battery cells arranged in at least two battery cell planes positioned one on top of the other, the device for cooling the battery cells as claimed in claim 1.

12. A motor vehicle comprising the traction battery of claim 11.

13. A device for cooling battery cells of a traction battery of a motor vehicle which are arranged in at least two battery cell planes that are positioned one above the other, said device comprising:
    a first cooling plate arranged (i) between a first battery cell plane and a second battery cell plane, (ii) in thermal contact with the battery cells of the first battery cell plane, and (iii) in thermal contact with the battery cells of the second battery cell plane,
    at least one second cooling plate arranged within the first battery cell plane,
    at least one further second cooling plate arranged within the second battery cell plane and in thermal contact with multiple battery cells of the second battery cell plane,
    a cooling fluid inlet disposed on a first side of the first cooling plate,
    a cooling fluid outlet disposed on a second side of the first cooling plate,
    wherein each of said second cooling plates of the first battery cell plane and the second battery cell plane runs perpendicular to the first battery cell plane, and wherein each of said second cooling plates of the first battery cell plane and the second battery cell plane is in thermal contact with side walls of multiple battery cells of the respective battery cell plane,
    wherein the first cooling plate, the second cooling plates, the cooling fluid inlet and the cooling fluid outlet are arranged in such a way that:
        (i) cooling fluid flows from the cooling fluid inlet into the first cooling plate on the first side of the first cooling plate,
        (ii) a first portion of the cooling fluid flowing into the first cooling plate on the first side flows through the first cooling plate toward the second side of the first cooling plate,
        (iii) a second portion of the cooling fluid flowing into the first cooling plate on the first side flows: (a) from the first cooling plate into the second cooling plates on the first side of the first cooling plate, (b) through the second cooling plates, and (c) from the second cooling plates into the first cooling plate on the second side of the first cooling plate, and
        (iv) the cooling fluid flows from the first cooling plate into the cooling fluid outlet on the second side of the first cooling plate.

14. The device as claimed in claim 13, further comprising:
    a first flow channel formed on the first side of the first cooling plate,
    a second flow channel formed on the second side of the first cooling plate, and
    multiple third flow channels of the first cooling plate extend between the first flow channel of the first cooling plate and the second flow channel of the first cooling plate.

15. The device as claimed in claim 14,
    wherein the first flow channel of the first cooling plate is coupled to the cooling fluid inlet such that cooling fluid flows from the cooling fluid inlet into the first cooling plate on the first side of the first cooling plate,
    wherein the first flow channel of the first cooling plate and the second flow channel of the first cooling plate are coupled to the third flow channels of the first cooling plate such that a first portion of the cooling fluid flowing into the first cooling plate on the first side flows through the first cooling plate toward the second side of the first cooling plate,
    wherein the first flow channel of the first cooling plate and the second flow channel of the first cooling plate are coupled to the second cooling plate such that a second portion of the cooling fluid flowing into the first cooling plate on the first side flows: (a) from the first cooling plate into the second cooling plates on the first side of the first cooling plate, (b) through the second cooling plates, and (c) from the second cooling plates into the first cooling plate on the second side of the first cooling plate, and
    wherein the second flow channel of the first cooling plate is coupled to the cooling fluid outlet such that the cooling fluid flows from the first cooling plate into the cooling fluid outlet on the second side of the first cooling plate.

16. The device as claimed in claim 1, wherein the second cooling plates are oriented perpendicular to the first cooling plate.

17. The device as claimed in claim 1, wherein the first cooling plate separates the first battery cell plane from the second battery cell plane.

18. The device as claimed in claim 1, wherein the further second cooling plate has fluid cooling channels.

\* \* \* \* \*